US011783439B2

(12) United States Patent
Halasz et al.

(10) Patent No.: US 11,783,439 B2
(45) Date of Patent: Oct. 10, 2023

(54) LEGAL DOCUMENT ANALYSIS PLATFORM

(71) Applicant: LAINA Pro, Inc., Eldersburg, MD (US)

(72) Inventors: Steven J. Halasz, North Ridgeville, OH (US); Patrick Halasz, Eldersburg, MD (US)

(73) Assignee: LAINA Pro, Inc., Eldersburg, MD (US)

( * ) Notice: Subject to any disclaimer, the term of this patent is extended or adjusted under 35 U.S.C. 154(b) by 683 days.

(21) Appl. No.: 16/744,494

(22) Filed: Jan. 16, 2020

(65) Prior Publication Data

US 2020/0226700 A1 Jul. 16, 2020

Related U.S. Application Data

(60) Provisional application No. 62/792,940, filed on Jan. 16, 2019.

(51) Int. Cl.
*G06Q 50/18* (2012.01)
*G06N 20/00* (2019.01)

(52) U.S. Cl.
CPC ............ *G06Q 50/18* (2013.01); *G06N 20/00* (2019.01)

(58) Field of Classification Search
CPC ..................................................... G96Q 50/18
See application file for complete search history.

(56) References Cited

U.S. PATENT DOCUMENTS

| | | | | |
|---|---|---|---|---|
| 8,781,815 | B1 | 7/2014 | Gidney | |
| 9,268,768 | B2 | 2/2016 | Gidney | |
| 9,805,025 | B2 | 10/2017 | Gidney | |
| 9,996,528 | B2 | 6/2018 | Gidney | |
| 2003/0061201 | A1* | 3/2003 | Grefenstette | G06F 16/38 |
| 2015/0310128 | A1* | 10/2015 | Brav | G06F 16/9024 707/800 |
| 2016/0140210 | A1* | 5/2016 | Pendyala | G06F 40/205 707/737 |
| 2016/0314549 | A1* | 10/2016 | Carothers | G06F 16/338 |
| 2018/0268506 | A1* | 9/2018 | Wodetzki | G06N 5/046 |

OTHER PUBLICATIONS

Donahue, Lauri, "A Primer on using artificial intelligence in the legal profession," Harvard Journal of Law and Technology [online] published Jan. 3, 2018, available at: < https://jolt.law.harvard.edu/digest/a-primer-on-using-artificial-intelligence-in-the-legal-profession > (Year: 2018).*

* cited by examiner

*Primary Examiner* — Richard W. Crandall
(74) *Attorney, Agent, or Firm* — McCarter & English, LLP

(57) ABSTRACT

A legal document analysis platform is described. The platform uses an AI model to evaluate the favorability of sentences within a proposed legal document. The platform also suggests alternative sentences for one or more sentences in the proposed legal document.

17 Claims, 17 Drawing Sheets

Figure 5:
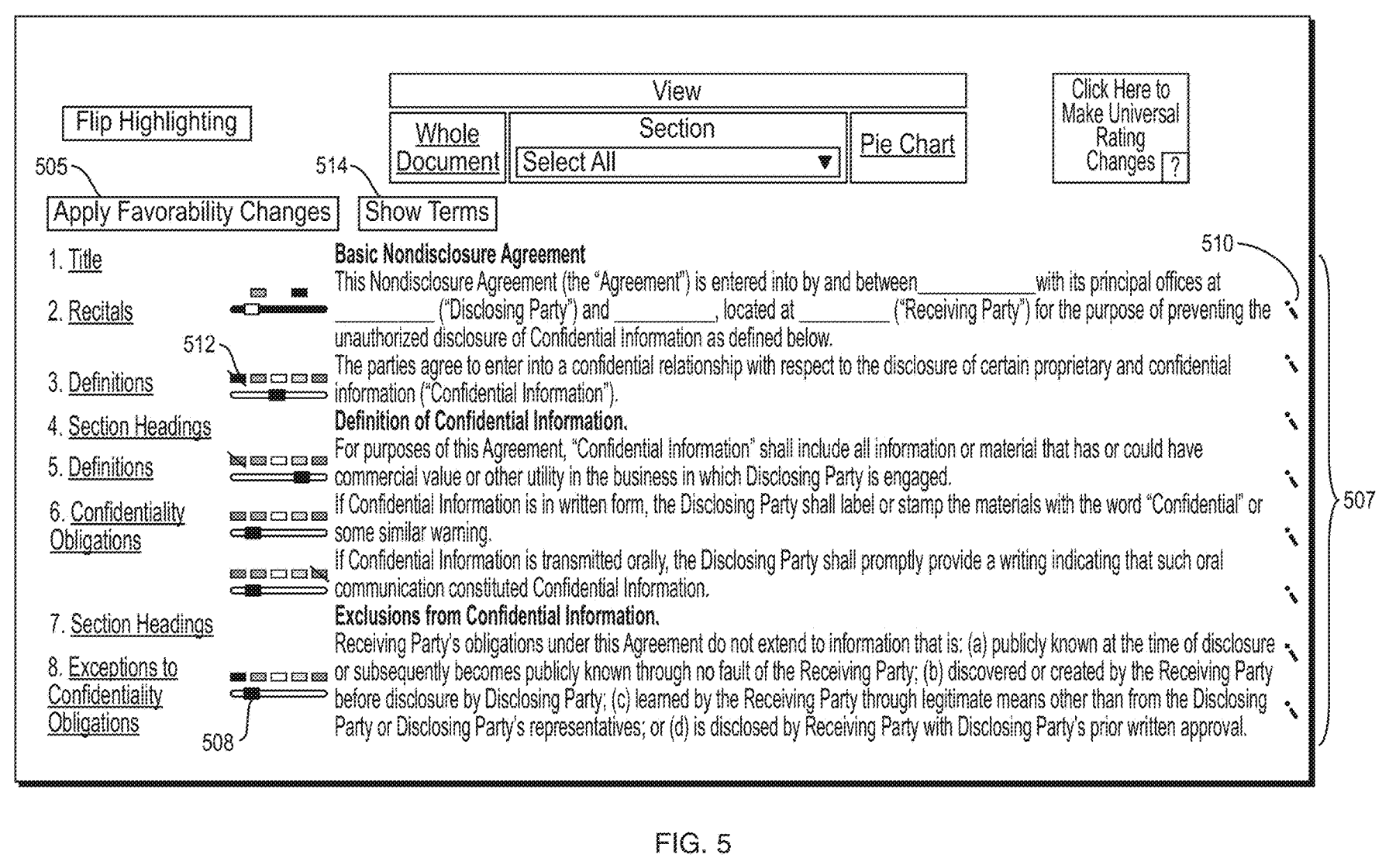

Flip Highlighting

View

Whole Document

Section

Select All

Pie Chart

Click Here to Make Universal Rating Changes ?

505

Apply Favorability Changes

514

Show Terms

1. Title

2. Recitals

512

3. Definitions

4. Section Headings

5. Definitions

6. Confidentiality Obligations

7. Section Headings

8. Exceptions to Confidentiality Obligations

508

510

507

Basic Nondisclosure Agreement

This Nondisclosure Agreement (the "Agreement") is entered into by and between ____________ with its principal offices at __________ ("Disclosing Party") and __________, located at _________ ("Receiving Party") for the purpose of preventing the unauthorized disclosure of Confidential Information as defined below.

The parties agree to enter into a confidential relationship with respect to the disclosure of certain proprietary and confidential information ("Confidential Information").

Definition of Confidential Information.

For purposes of this Agreement, "Confidential Information" shall include all information or material that has or could have commercial value or other utility in the business in which Disclosing Party is engaged.

If Confidential Information is in written form, the Disclosing Party shall label or stamp the materials with the word "Confidential" or some similar warning.

If Confidential Information is transmitted orally, the Disclosing Party shall promptly provide a writing indicating that such oral communication constituted Confidential Information.

Exclusions from Confidential Information.

Receiving Party's obligations under this Agreement do not extend to information that is: (a) publicly known at the time of disclosure or subsequently becomes publicly known through no fault of the Receiving Party; (b) discovered or created by the Receiving Party before disclosure by Disclosing Party; (c) learned by the Receiving Party through legitimate means other than from the Disclosing Party or Disclosing Party's representatives; or (d) is disclosed by Receiving Party with Disclosing Party's prior written approval.

Figure 6:
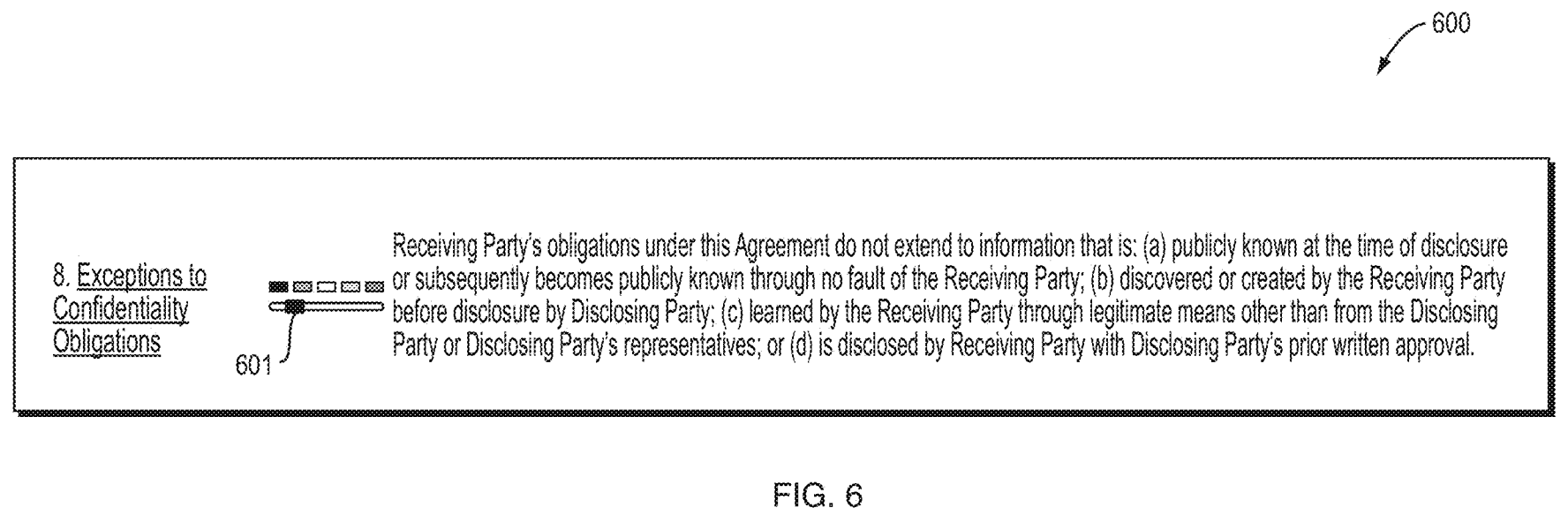

8. Exceptions to Confidentiality Obligations

601

Receiving Party's obligations under this Agreement do not extend to information that is: (a) publicly known at the time of disclosure or subsequently becomes publicly known through no fault of the Receiving Party; (b) discovered or created by the Receiving Party before disclosure by Disclosing Party; (c) learned by the Receiving Party through legitimate means other than from the Disclosing Party or Disclosing Party's representatives; or (d) is disclosed by Receiving Party with Disclosing Party's prior written approval.

Figure 7:
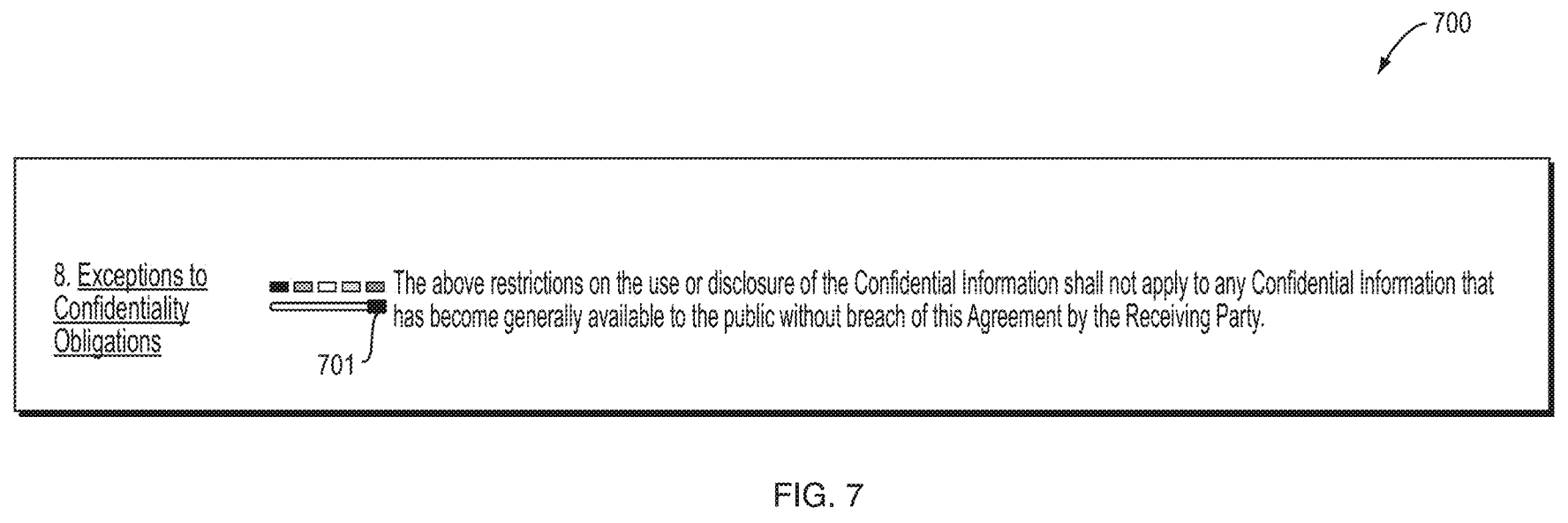

8. Exceptions to Confidentiality Obligations

The above restrictions on the use or disclosure of the Confidential information shall not apply to any Confidential information that has become generally available to the public without breach of this Agreement by the Receiving Party.

MODIFIED INFO PAGE 901 902 903

| Document: | Nondisclosure Agreement 1 | View Document | Return |
|---|---|---|---|

You are logged in 904 905 906 907

| Type of Provision | Click to Show/ Hide Full Provision | Full Modified Provision Details | Prior (Unmodified) Provision Details for Comparison |
|---|---|---|---|
| Exceptions to Confidentiality Obligations | ○ | **Exceptions to Confidentiality Obligations.** The above restrictions on the use or disclosure of the Confidential Information shall not apply to any Confidential Information that has become generally available to the public without breach of this Agreement by the Receiving Party. | **Exceptions to Confidentiality Obligations.** Receiving Party's obligations under this Agreement do not extend to information that is (a) publicly known at the time of disclosure or subsequently becomes publicly known through no fault of the Receiving Party; (b) discovered or created by the Receiving Party before disclosure by Disclosing Party; (c) learned by the Receiving Party through legitimate means other than from the Disclosing Party or Disclosing Party's representatives; or (d) is disclosed by Receiving Party with Disclosing Party's prior written approval. |

908 Show Alternatives

909

| | Alternative Modified Provision Details |
|---|---|
| Choose | The above restrictions on the use or disclosure of the Confidential Information shall not apply to any Confidential Information that has become generally available to the public without breach of this Agreement by the Receiving Party |
| Choose | Receiving Party understands that Confidential Information does not include any of the following items which has become publicly known or made generally available through no wrongful act of Receiving Party |
| Choose | The above restrictions on the use or disclosure of the Confidential Information shall not apply to any Confidential Information that has entered the public domain without breach of this Agreement by the Receiving Party |

| | Value | Description of Requested Information | WC Code |
|---|---|---|---|
| ✎ | Receiving Party | Used within system phrases for buyer | {party_a_buyer} |
| ✎ | Disclosing Party | Used within system phrases for seller | {party_b_seller} |
| ✎ | | Seller's jurisdiction/state of incorporation/formation for entities, or state of residency for humans | {s.juris} |
| ✎ | | Title of Contract | {k.title} |
| ✎ | | Seller's type/form of entity, or "individual" for humans | {s.form} |
| ✎ | | Buyer's type/form of entity, or "individual" for humans | {b.form} |
| ✎ | | Buyer's jurisdiction/state of incorporation/formation for entities, or state of residency for humans | {b.juris} |
| ✎ | | Effective date of the contract; generally, this will be the same as the contract date, so this should go into the introductory section | {date.eff} |
| ✎ | | Buyer's name | {b.name} |
| | | Buyer's address | {b.address} |
| ✎ | | Seller's name | {s.name} |
| | | Seller's address | {s.address} |

LEGAL DOCUMENT ANALYSIS PLATFORM

RELATED APPLICATION

This application claims priority to U.S. Provisional Application Ser. No. 62/792,940 filed on Jan. 16, 2019, the content of which is incorporated by reference herein in its entirety.

BACKGROUND

Artificial intelligence and machine learning are increasingly being used to assist human beings in their daily lives. Machine learning algorithms may generate an artificial intelligence (AI) model based on training data. The training data may be classified by a user or process before being provided to the machine learning algorithm. The generated AI model may then be used to analyze input data to make predictions or decisions about the input data without being explicitly programmed to perform a task. Additional training data may be used to further refine and improve the accuracy of the AI model.

BRIEF DESCRIPTION OF DRAWINGS

To assist those of skill in the art in making and using the described system and associated methods, reference is made to the accompanying figures. The accompanying figures, which are incorporated in and constitute a part of this specification, illustrate one or more embodiments described in this specification and, together with the description, help to explain the embodiments. Illustrative embodiments are shown by way of example in the accompanying drawings and should not be considered as limiting. In the figures:

FIG. 5 is a GUI displaying the analyzed document, in accordance with an exemplary embodiment of the disclosure;

FIG. 6 is a GUI displaying a provision of the analyzed document, in accordance with an exemplary embodiment of the disclosure;

FIG. 7 is a GUI displaying an alternative provision of the analyzed document, in accordance with an exemplary embodiment of the disclosure;

FIG. 9 is a GUI displaying an alternative modified provision, in accordance with an exemplary embodiment of the disclosure;

FIG. 16 is a GUI displaying a page of wild cards of the analyzed legal document, in accordance with an exemplary embodiment.

DETAILED DESCRIPTION

Figure 1:
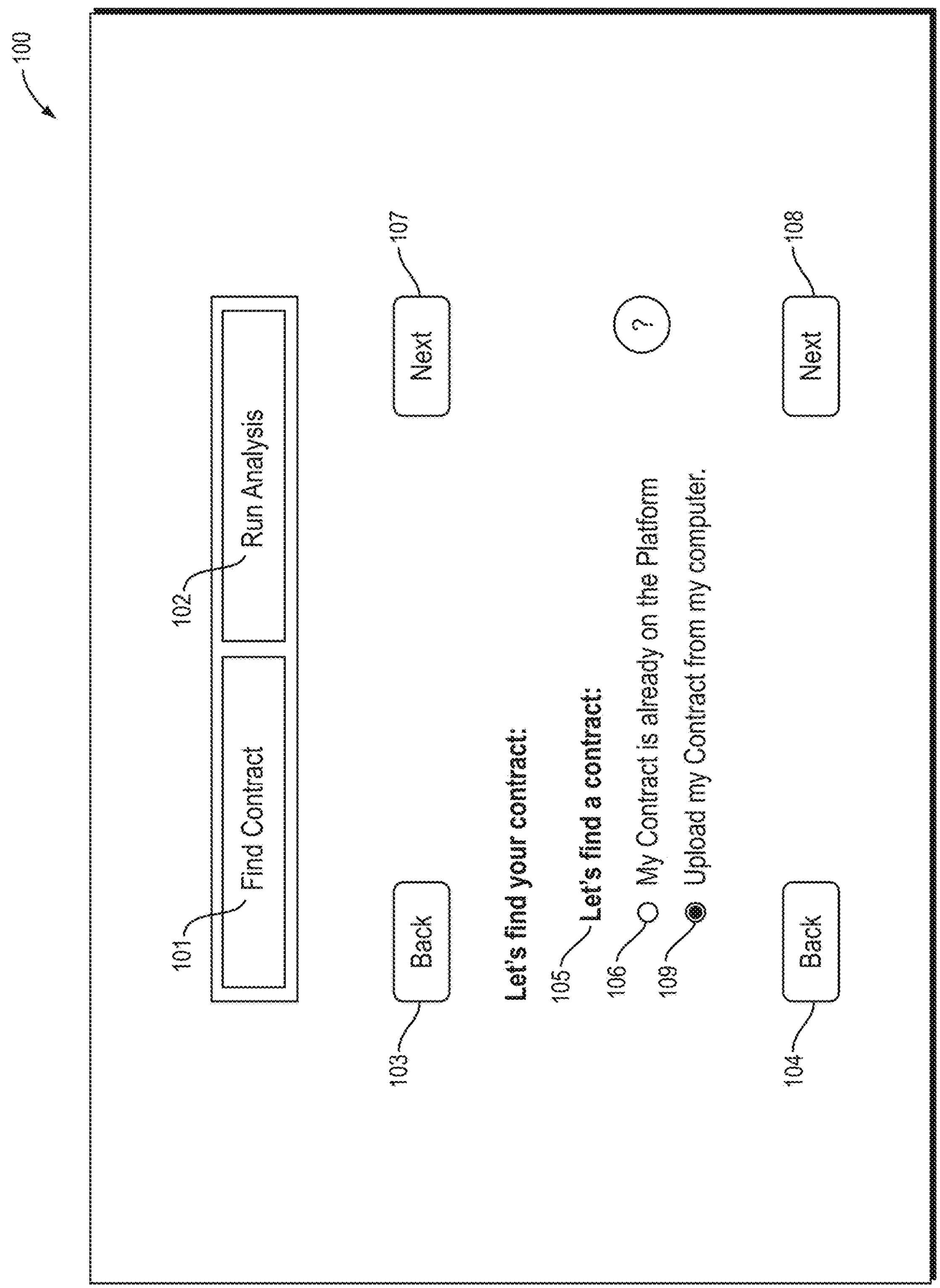
FIG. 1 is a graphical user interface (GUI) prompting a user to select a document for analysis, in accordance with an exemplary embodiment of the disclosure.

Embodiments of the present invention provide a software-provided platform (hereafter "the platform") for contract/legal document analysis that uses an AI model generated by a machine learning algorithm to predict the favorability of sentences in a proposed legal document. More particularly, in one embodiment an AI model is generated based upon a supervised training set of data including classified sentences commonly found in legal documents. A proposed legal document is analyzed by the AI model and the favorability of each sentence in the document to the user is predicted. The favorability of each sentence indicates how favorable the sentence is to the user. The platform may suggest an alternative to each sentence to the user from a group of corresponding sentences known to the platform. The platform may also enable the user to adjust the desired favorability of legal document sentences and receive alternative sentences based upon the adjusted favorability level.

In an embodiment, there may be 2 classes of users of the platform, administrators and users. An administrator can access the system to improve the functionality of the system such as by adjusting parameters used to generate the AI model and by submitting further training data to the machine learning algorithm. A user can use the system based upon the functionality delivered by the administrator(s).

In one embodiment, prior to performing document analysis, the platform trains a machine learning algorithm to build an AI model. To perform the training, documents are imported into the system. The documents may be in a number of different formats such as, but not limited to, MS Word docx documents or .pdf documents. Each document is parsed to identify sentences. To do so, in one embodiment, sentences are stored individually and tagged to maintain the original input sequence. Attributes are assigned so that the sentence can be replaced in the original source document. Words are identified within the sentence and tokenized. Each sentence may then include its original wording, and a tokenized version. The tokenized version may not include stop words such as a, an, the, etc. An administrator can review the sentences of the document to add them to the database of known sentences. In one embodiment, each sentence being added to the system:

a. Is assigned as either a miscellaneous type, or a favorability type. Examples of favorability types include strongly favors receiving party, favors receiving party, neutral, favors disclosing party, and strongly favors disclosing party. These examples may change based on the legal document. Miscellaneous type sentences are not assigned favorability ratings and are treated differently as discussed further herein.

b. Is assigned a favorability rating, if a favorability type of sentence, that indicates how favorable the sentence is to a party.

c. Is standardized based upon the parties to the legal document. For example, for a non-disclosure agreement, the sentence is standardized to identify it as directed to the Receiving Party or the Disclosing Party.

d. Is associated with a "provision", and thus becomes another alternative for that provision. A "provision" in the platform described herein is a grouping of sentences, all of which relate to the same topic, with alternative wordings and with differing favorability ratings.

An AI model may then be generated by providing this classified dataset as training data to a machine learning algorithm. The sentences identified as "favorability type" are uploaded as a dataset to the machine learning algorithm. The uploaded dataset may include a sentence identifier, the favorability rating for the sentence, and the sentence itself. A sentence identifier is a unique number associated with the sentence in the corpus. Parameters may be set for the AI model creation process and the trained machine learning algorithm builds an AI model. For example, parameters for AI model creation that may be adjusted are categorization versus numerical model, the number of iterations, and the amount of data being used to create the model.

Once the AI model has been created, it can be used by the platform to analyze a proposed legal document pursuant to a user's command. In one embodiment, the analysis may include the following steps:

a. The parties in the legal document are identified.

b. Each sentence of the document is standardized to a particular party. For example, in the case of a non-disclosure agreement, the parties may be standardized to "Disclosing Party" and "Receiving Party".

c. Each sentence is compared to the known sentences for an exact match.

i. Exact matches are associated with the provision of the exact match sentence.

ii. The favorability of the known sentence is assigned to the document sentence.

d. Unmatched sentences are compared to known sentences using the tokenized version of the sentences.

i. A best-fit match to a known sentence is selected.

ii. This best-fit match identifies the provision of the document sentence.

e. A document dataset is created, which includes a sentence identifier and the sentence, and is submitted to the AI model for evaluation.

f. The AI model evaluates each sentence and predicts a favorability rating for each sentence.

g. The AI model creates a result dataset consisting of the sentence identifier and the predicted favorability of the sentence.

h. The result dataset from the AI model is used by the platform to set the favorability of all of the document sentences which did not have an exact match.

The platform provides the user with a user interface (UI) where the user can see the document broken into the individual sentences, each sentence with its own color-coded favorability rating predicted by the AI model. The text of each sentence is color coded, and the color indicates whether it is favorable or not. For example, in one embodiment, the colors are similar to a stop light in which dark green is very favorable to the user, light green is favorable to the user, yellow is neutral, light red is favorable to the other party, and dark red is very favorable to the other party. However, different embodiments may use different colors or different methods to display the favorability rating.

In one embodiment, the user can adjust the favorability of a sentence, for example, using a slider-bar provided by the UI. Using the above example, the user can slide the slider-bar to select dark green, light green, yellow, light red, or dark red. The user can move the slider bar next to a provision to make the provision more or less favorable to the user. For example, this enables a user to select light green or dark green to change a sentence that is rated unfavorable to the user (shown as light red or dark red) to a sentence that is rated favorable to the user. When the favorability is changed, the platform may select the closest match known sentence with the desired favorability rating from among the alternative sentences associated with the provision. In one embodiment, the user can review all known sentences associated with the favorability rating of the provision and select one of those in place of the platform-assigned alternative sentence. In an embodiment, the user can manually edit the sentence to further tailor the sentence if desired and the changes may be applied to the original user document and exported to an indicated location.

In some embodiments, an administrator may continuously improve the platform by adjusting the machine learning parameters to create multiple versions of the AI Model. Once multiple AI models have been created, the platform may enable the administrator to compare the results of analysis of a legal document using the different AI model versions to identify which model produces results that are more accurate. Further, the administrator has the option to continue to submit further training data to the machine learning algorithm to improve predictability. The additional training data may include the result(s) of user selections following document analysis by the AI model.

In one embodiment, the platform may be deployed as a web-based application providing a UI for input and output. In one embodiment, the platform may include the machine learning algorithm and AI model. In another embodiment, the platform may interact with a machine learning algorithm provided as a third party service that generates the AI model following parameter selection and training data submission by the administrator. In such a scenario, the input data for the proposed document discussed above may be submitted to the third party service for analysis by the previously generated AI model and the results returned to the platform.

In one embodiment, the platform may recommend one or more replacement sentences, and provide a graphical user interface (GUI) that allows a user to replace each sentence in the document with a replacement sentence. Each replacement sentence may have a favorability rating associated with it. This favorability rating may be based on a machine learning algorithm that has been trained to identify which sentences are likely to be favorable, neutral, or unfavorable to the user, or based on favorability as assigned by the administrator.

In one embodiment, an element, such as a button, is embedded next to each sentence in the analyzed legal document. The element provides insight into a purpose of the associated sentence in the legal document. For example, with respect to an integration provision, when a user hovers over or selects the button, the insight may state, "this term says that everything the parties agreed to is in this contract. Without it, the risks are heightened that a party could later introduce evidence of other representations or agreements concerning the subject of this contract."

In one embodiment, a "commercial terms" box is located within the UI. The "commercial terms" box enables users to quickly focus on a few key commercial items—such as the contract duration or payment terms.

In one embodiment, the platform may utilize "wild cards." Legal documents, such as contracts, often have pieces of information, referenced herein as tailored information, that are tailored for a particular user or a particular legal document—such as the parties' names, governing law (e.g., Delaware versus California), pricing, term of the agreement (e.g., 3 year contract term, 1 year contract term, etc.), duration of a warranty, etc. A wild card is a generic tag that replaces a piece of tailored information. The platform may identify the tailored information in the legal document and then replace the tailored information with the wild card(s). Wild cards are used for several related purposes, each tied to tailored information, including, without limitation:

(1) to maintain confidentiality of user-specific tailored information while still permitting use of an anonymized version of the relevant sentence in creating the AI model, (2) to enable the software to recognize where tailored information exists, including for the purposes of:

(a) improving accuracy of the platform's sentence-matching function, (b) enabling users to add or replace tailored information in a legal document, including when replacing a sentence with a sentence from the alternatives database (i.e., the corpus), and (c) highlighting key commercial terms for the user, (3) for certain types of tailored information, to guide the AI model assessment of favorability ratings for unknown sentences in a legal document (e.g., the governing law provision would generally be seller favorable if it refers to the state where the seller is located).

For example, a wild card may be used to change a sentence from "the term of this Agreement is three years" to "the term of this Agreement is {t.term}," where "t.term" is the wild card. If the user selects a new alternative for such a sentence, the same wild card value for "t.term" may be populated in the appropriate location in such new alternative. The user may also manually adjust the value of the wild card. If the user changes such "t.term" value to a different "t.term" value, all wild cards of "t.term" within the legal document are replaced with the new "t.term" value. In some embodiments, the wild card value is associated with answer(s) to question(s) asked of the user (e.g., how long do you want your contract to last). The wild cards appear in alternatives in the database.

FIGS. 1-12 depict a series of screenshots provided by the platform enabling a user to select a document for analysis, review the results of the analysis performed by the AI model, and adjust provisions based on favorability.

FIG. 1 is a graphical user interface (GUI) prompting a user to select a document for analysis, in accordance with an exemplary embodiment of the disclosure. Analysis wizard 100 is a GUI displaying a plurality of icons. For example, analysis wizard pane 100 displays a find contract icon 101, run analysis icon 102, back icon 103, back icon 104, next icon 107, and next icon 108. When the find contract icon 101 is selected, a prompt to find a contract 105, a radio button 106, and a radio button 109 may be presented in the analysis wizard pane 100. The radio buttons correspond to storage locations from which a user can retrieve a document. The radio button 106 may correspond to a storage location on a software platform where the document was saved and created. The radio button 109 may correspond to a storage location on a computing device that the GUI is being displayed on. The back icon 103 and the back icon 104 when selected may cause a display on the computing device to display a GUI that was displayed prior to the analysis wizard 100. The next icon 107, 108 when selected may cause the display, on the computing device, to display a GUI that shows the storage location from which the user will select the document. For example, in FIG. 1 the storage location where the document is stored is on the user's computer may be selected. After the GUI receives an input corresponding to the execution of the next icon 107, 108, a further screen for uploading a contract 200 (See FIG. 2) may be displayed on the computing device. The run analysis pane 102 corresponds to a GUI that is displayed on the computing device when the user is prompted to select an icon to initiate the analysis (Run analysis icon 405).

Figure 2:
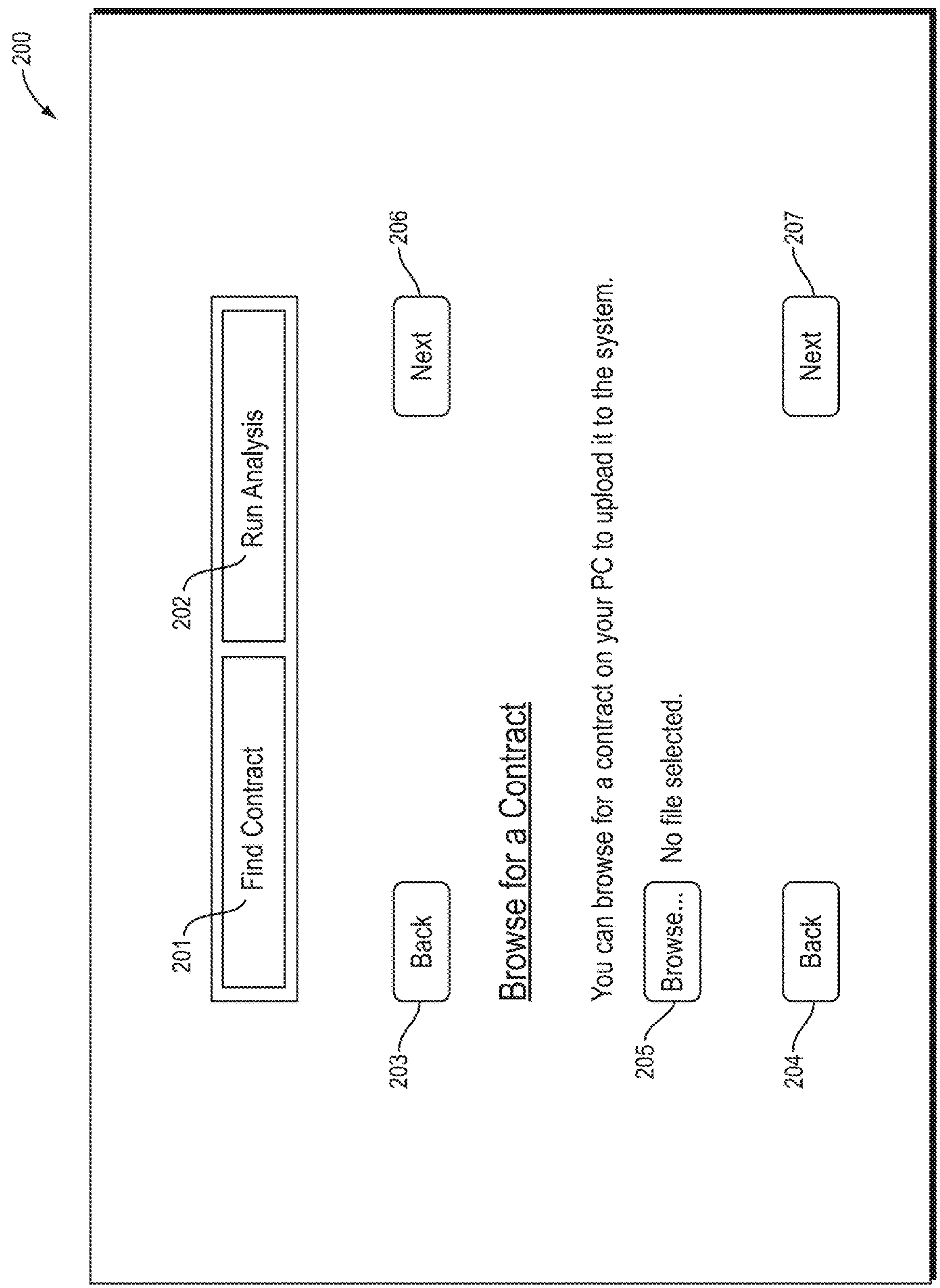
FIG. 2 is a GUI enabling a user to upload a document for analysis, in accordance with an exemplary embodiment of the disclosure.

FIG. 2 is a GUI 200 enabling a user to upload a document for analysis, in accordance with an exemplary embodiment of the disclosure. A selection of browse icon 205 may cause navigation to a storage location on the computing device where the desired document is stored. After the GUI 200 receives an input corresponding to the execution of the next icon 206, 207, an element enabling the user to select contract/legal document type and party 300 (See FIG. 3) may be displayed on the computing device. GUI 200 may further display a find contract icon 201, run analysis icon 202, back icon 203, back icon 204, next icon 206, and next icon 207.

Figure 3:
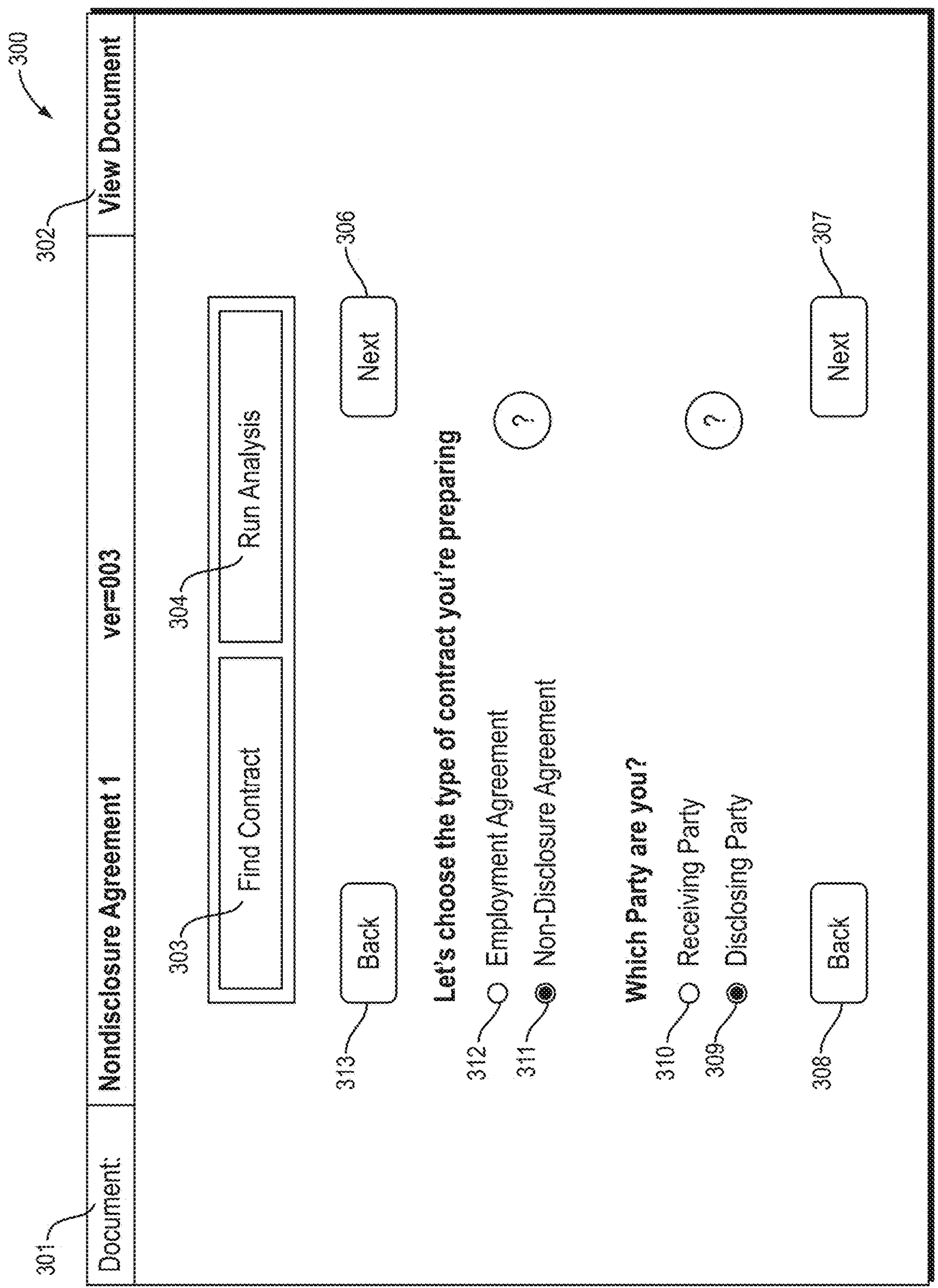
FIG. 3 is a GUI prompting the user to identify a document type and the party that the user is affiliated with, in accordance with an exemplary embodiment of the disclosure.

FIG. 3 is a GUI 300 prompting the user to identify a document type and the party that the user is affiliated with, in accordance with an exemplary embodiment of the disclosure. Document 301 may correspond to the title of the document selected by the user. For example, in FIG. 3 the title of the document is "Nondisclosure Agreement 1 (D) ver=001". View document 302 when executed may cause the GUI 300 to display the document selected by the user. The radio button 312 may indicate that the type of legal document, or contract, that the user has selected for analysis is an employment agreement. The radio button 311 may indicate that the type of legal document, or contract, that the user has selected for analysis is a non-disclosure agreement. The radio button 310 may be selected by the user when the user is the receiving party. The radio button 309 may be selected by the user when the user is the disclosing party. After the GUI 300 receives an input corresponding to the execution of the next icon 306, 307, analysis execution 400 (See FIG. 4) may be displayed on the computing device.

Figure 4:
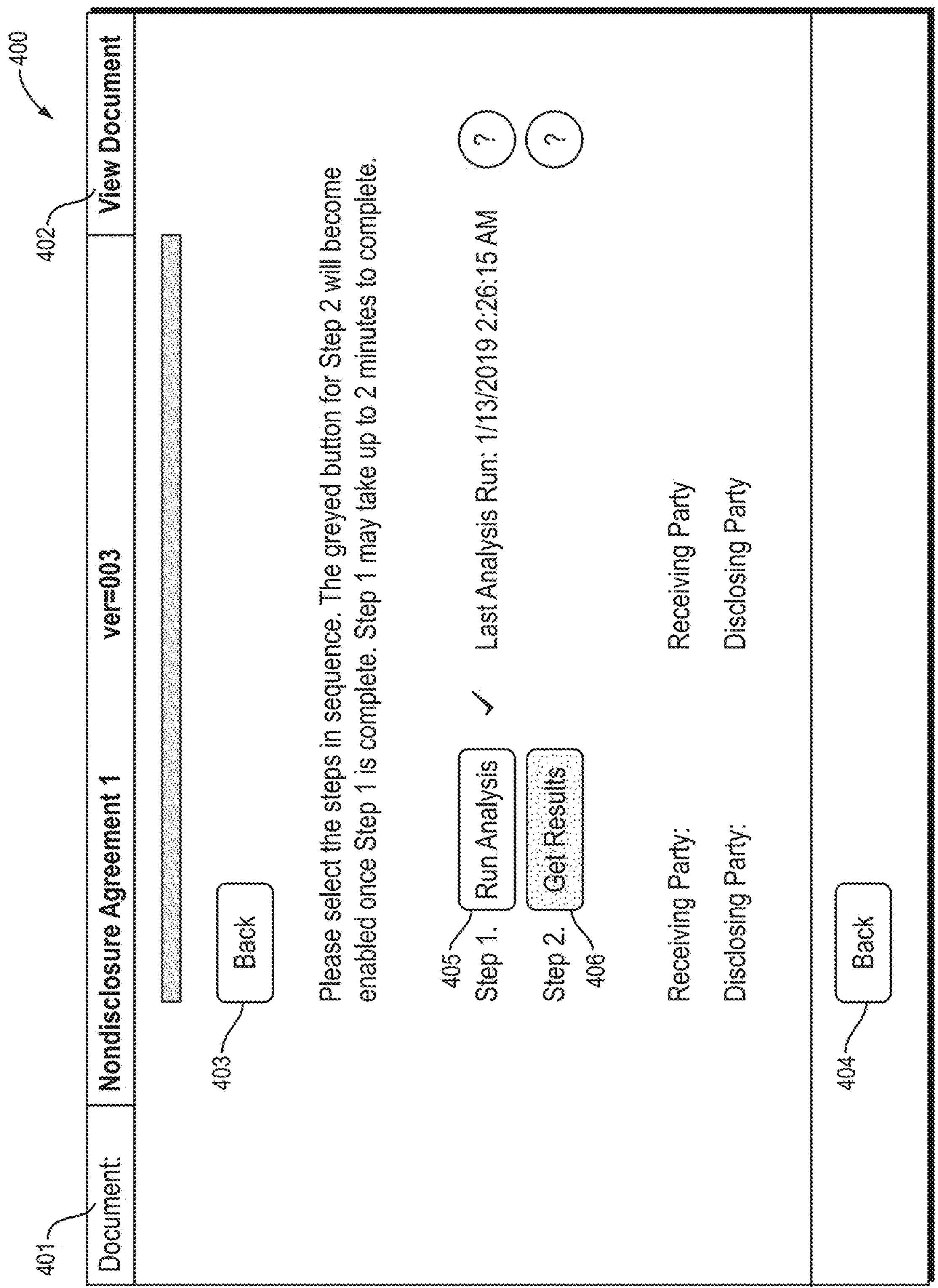
FIG. 4 is a GUI prompting the user to select the steps to execute the analysis of the document, in accordance with an exemplary embodiment of the disclosure.

FIG. 4 is a GUI 400 prompting the user to select the steps to execute the analysis of the document, in accordance with an exemplary embodiment of the disclosure. Document 401 may correspond to document 301. Run analysis icon 405 is an icon which when executed may cause the computing device analyze the selected document in accordance with the sequence of steps described herein. View document 402 when executed may cause the GUI 400 to display the document selected by the user. GUI 400 may further display a get results icon 406 to obtain the results of the analysis of the selected document, back icon 403, and back icon 404.

FIG. 5 is a GUI displaying the analyzed document, in accordance with an exemplary embodiment of the disclosure. Document 507 includes headings and paragraphs of the analyzed document. There may be multiple sections that correspond to different portions of the document. For example, "3. Definitions", "4. Section Headings", "5. Definitions", "6. Confidentiality Obligations", "7. Section Headings", "8. Exceptions to Confidentiality Obligations", "9. Section Headings", and "10. Confidentiality Obligations"

are document sections. Each section may have one or more sentences that have been analyzed by the AI model.

As noted above, a "provision" in the platform is a grouping of sentences, all of which relate to the same topic, with alternative wordings and with differing favorability ratings. The text of each provision, excluding the section headings, may be displayed in a different color font. For example, text displayed in dark red font may indicate that the provision is a very unfavorable provision for the user. Text displayed in light red font may indicate that the provision is somewhat unfavorable for the user. Text displayed in yellow may indicate that the provision is neutral for the user (this font may appear black in the document itself). Text displayed in light green may indicate that the provision is somewhat favorable for the user. Text displayed in dark green may indicate that the provision is very favorable for the user. It will be appreciated that other colors may be used in place of or in addition to those specifically discussed herein without departing from the scope of the present invention. A user may toggle between different favorability ratings for a given provision by adjusting a slider bar. Slider bar 508 is in a position that causes the text of the corresponding provision to be displayed in light green. For example, slider bar 508 could be moved to the left and the text of the corresponding provision will change from light green, to yellow, to light red, and finally dark red. It will be appreciated that other mechanisms may be used in place of the slider bar to adjust a favorability rating without departing from the scope of the present invention. The user selections may be saved and used to further refine the AI model as discussed above. Miscellaneous language such as section headings or certain terms that are not subject to favorability (such as an integration clause) are in black font with no slider bar, and they can be changed to a long or short form.

In some embodiments, the selected favorability ratings are applied, and the text changed accordingly, when the user selects the apply favorability changes icon 505.

In one embodiment, an element 510 is embedded next to each sentence in the legal document that provides information on a purpose of the associated sentence in the legal document. For example, when a user hovers over element 510, a text box appears in the GUI that states, "This is where you identify the parties, date, etc. Parties sometimes also include background information concerning the parties intentions in the same sentence."

In some embodiments, a slash thru a color on the slider bar (indicated by 512) indicates there are no alternatives available with that favorability. Some embodiments may show an X thru a color on the slider bar that indicates that there is no wording of the sentence which can meet that favorability rating, and selection of that favorability rating will cause the sentence to be deleted from the document. The deleted sentence may be displayed with a strikeout, and an undo button may be available to restore the sentence.

In one embodiment, a commercial terms element 514 is located within the UI. The user can select the commercial terms element 514 to view key commercial items—such as the contract duration or payment terms.

FIG. 6 is a GUI displaying a provision of the analyzed document, in accordance with an exemplary embodiment of the disclosure. Provision 600 corresponds to the "Exceptions to Confidentiality Obligations" provision of document 507. The text of provision 600 appears in light red as it has been predicted by the AI model as a slightly unfavorable rating and the slider bar 601 is in the corresponding position for an unfavorable rating.

FIG. 7 is a GUI displaying an alternative provision of the analyzed document, in accordance with an exemplary embodiment of the disclosure. Provision 700 is the same as provision 600 but a different sentence more favorable to the user/party has been substituted by the platform as a result of the user repositioning the slider bar 701 to a position calling for a more favorable document sentence.

Figure 8:
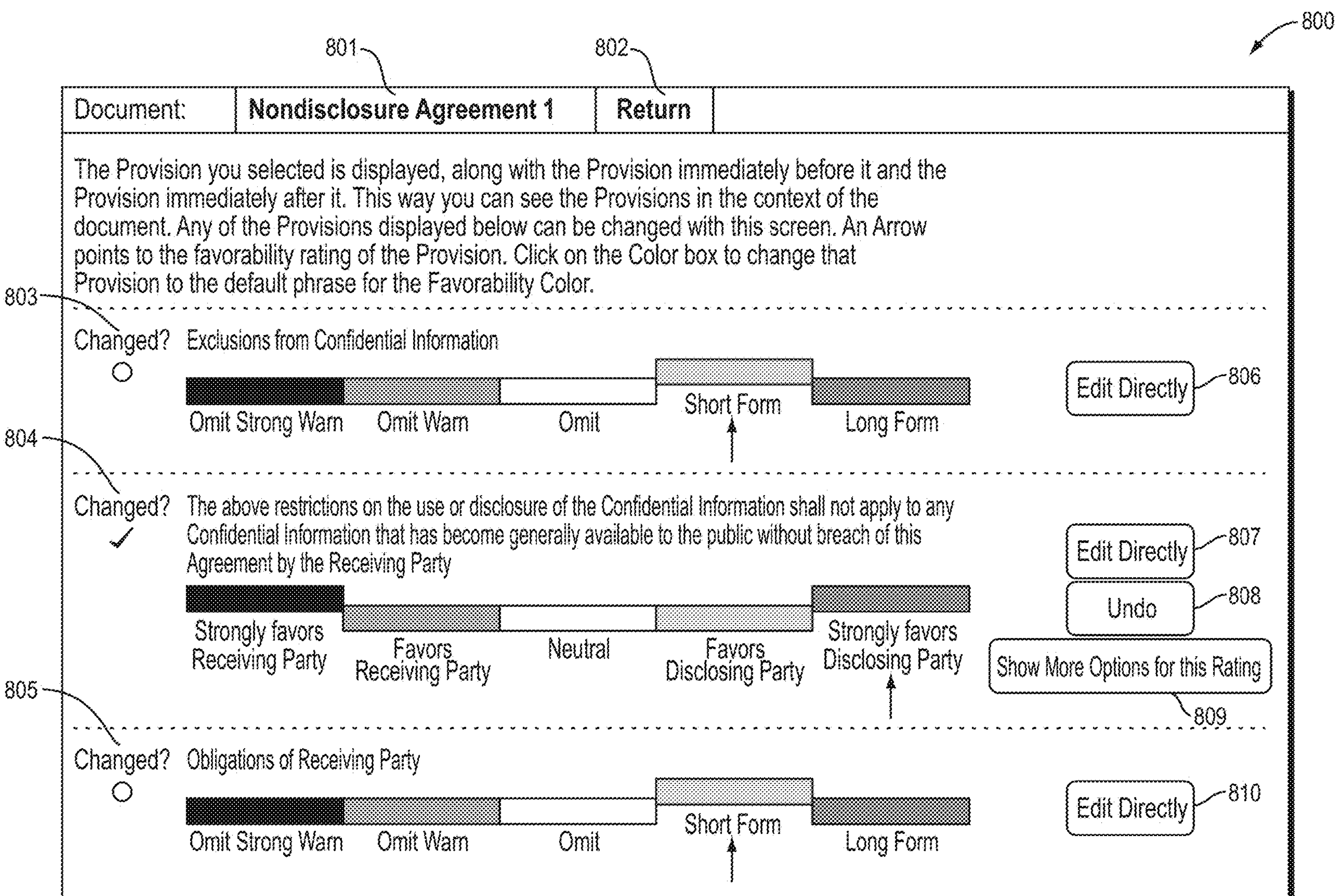
FIG. 8 is a GUI displaying a sequence of provisions of the analyzed document, in accordance with an exemplary embodiment of the disclosure.

FIG. 8 is a GUI 800 displaying a sequence of provisions of the analyzed document, in accordance with an exemplary embodiment of the disclosure. GUI 800 depicts a sequence of provisions with corresponding favorability color-coding. Provision 803 and provision 805 correspond to headings and therefore the color-coding scheme is not the same as the color coding-scheme of a non-heading provision such as provision 804. The user can select a specific provision in the document. The user can directly edit a given provision. For example, when edit directly icon 806 is executed a user may be able to edit provision 803. Similarly, when edit directly icon 807 or 810 is executed a user may be able to edit provision 804 or 805, respectively. It will be appreciated that provisions 803 and 805 are section headings and therefore do not have favorability ratings. Undo icon 808 when executed may update the document with the provision that was in the original document. Show more options for this rating icon 809 when executed may display additional replacement sentences that have an equivalent rating to the sentence corresponding to provision 804. GUI 800 may further display the title of the document 801 and a return pane 802.

FIG. 9 is a GUI displaying alternative modified provisions, in accordance with an exemplary embodiment of the disclosure. When show more options for this rating icon 809 is selected, modified info page 900 may be displayed. Each provision may have a single default for each favorability rating applicable to that provision. The type of provision pane 904 indicates the type of the original provision in the document. Click to show/hide full provision icon 905 is an icon which when selected will cause the recommended substitute sentence for the original provision to be displayed. Full modified provision details pane 906 displays the recommended substitute sentence for the original provision. Prior (unmodified) provision details for comparison pane 907 displays the unmodified provision details for comparison with the full modified provision details pane 906. Show alternatives icon 908, which when selected, may cause a table of alternative substitute sentences for the original provision to be displayed in alternative modified provision details pane 909. Modified info page 900 may further display the title of the document 901, a selectable element 902 to view the legal document, and a return pane 903.

Figure 10:
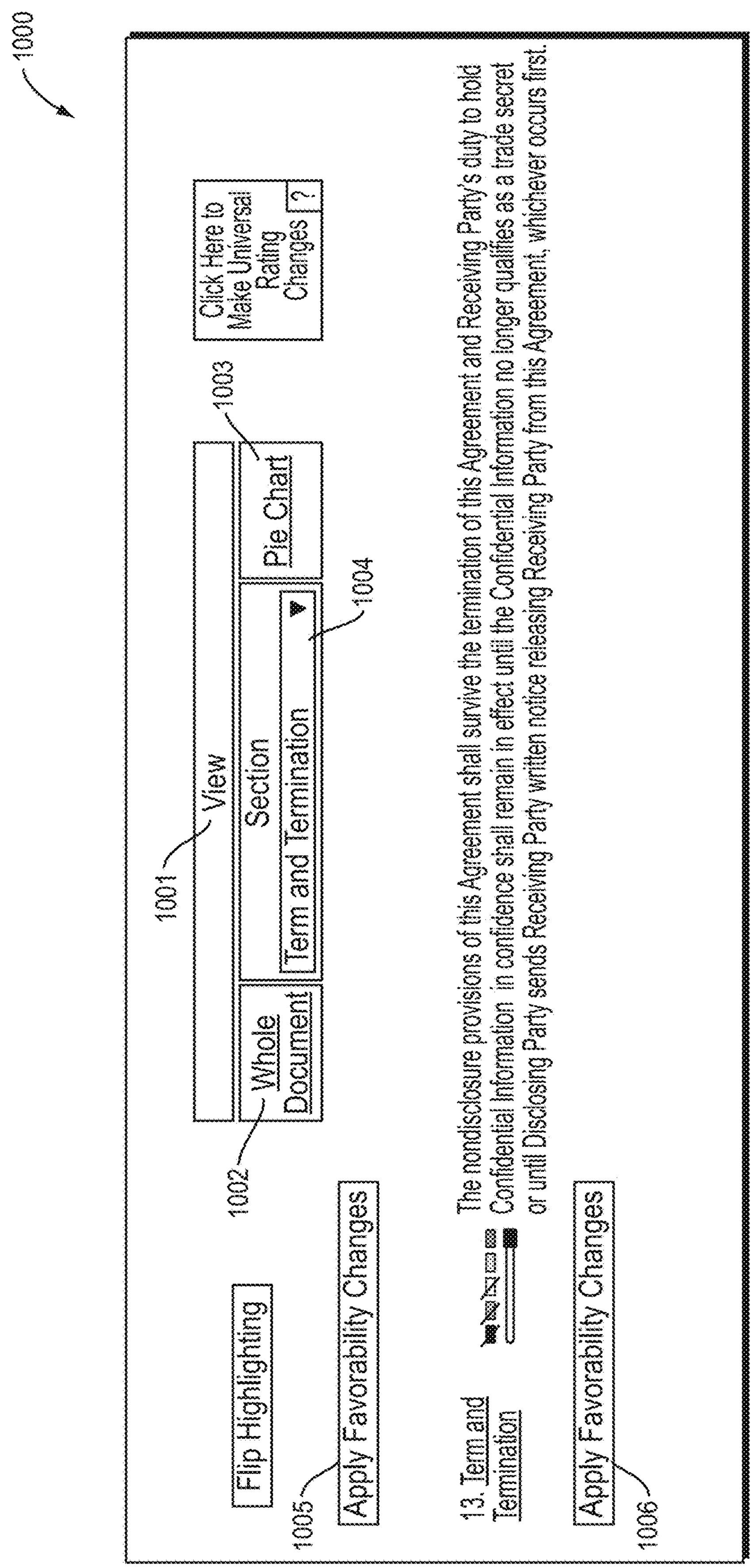
FIG. 10 is a GUI displaying a section of the analyzed legal document, in accordance with an exemplary embodiment of the disclosure.

FIG. 10 is a GUI 1000 displaying a section of the analyzed document, in accordance with an exemplary embodiment of the disclosure. GUI 1000 corresponds to a view of single provision displayed in dark green (a very favorable rating). A user may view the single provision by selecting the provision in the document. The user may reposition the slider bar to a different favorability position and apply the favorability changes by selecting the apply the favorability changes icons 1005, 1006. GUI 1000 further includes a view panel 1001, including selectable icons to view the legal document 1002, view all provisions for a section in such legal document such as terms and termination 1004, and view all provisions in such legal document aggregated based on favorability rating in the format of a pie chart 1003.

Figure 11:
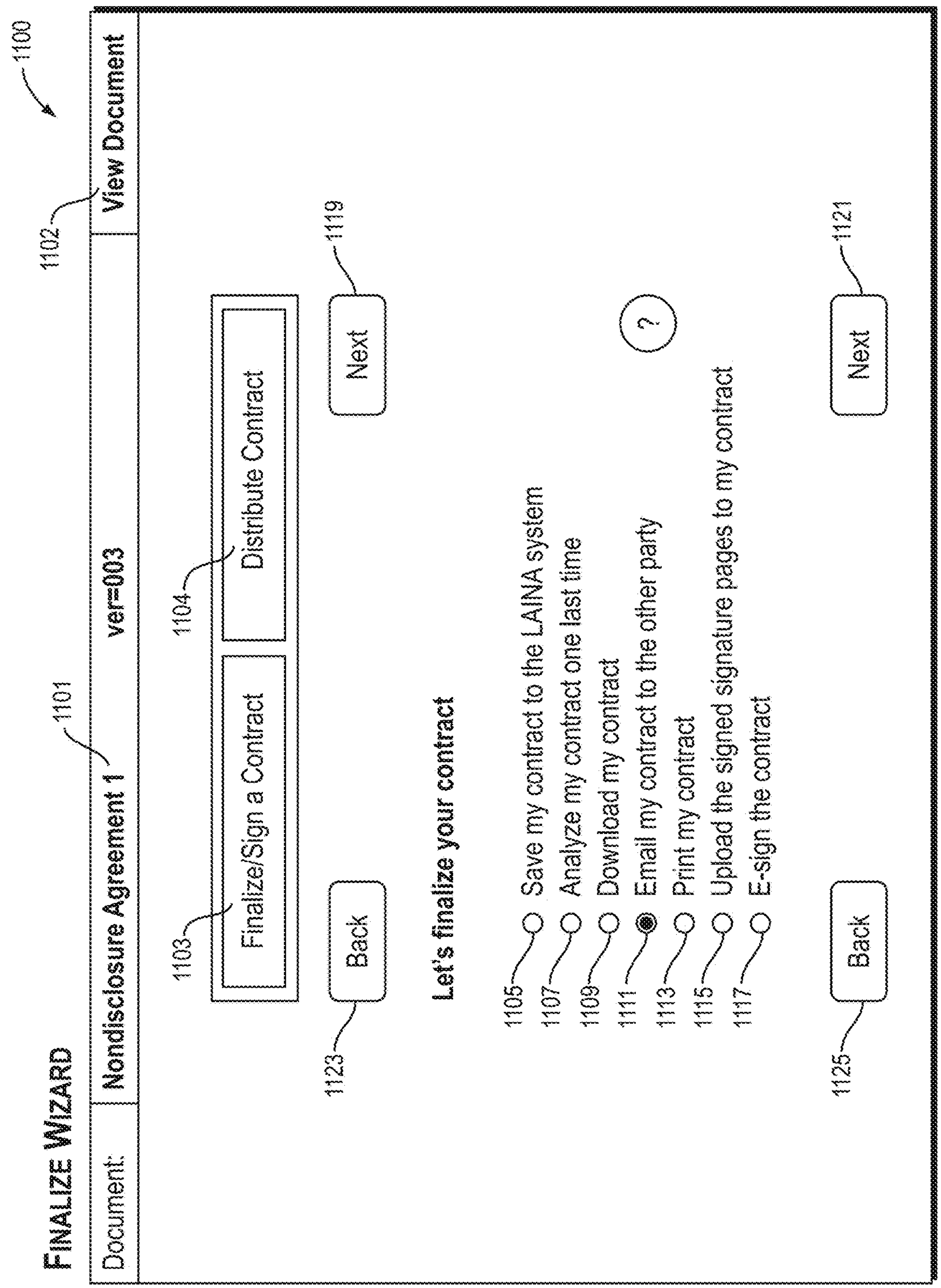
FIG. 11 is a GUI displaying one or more options to a user for exporting the analyzed document, in accordance with an exemplary embodiment of the disclosure.

FIG. 11 is a GUI displaying one or more options to a user for exporting the analyzed document, in accordance with an exemplary embodiment of the disclosure. Finalize wizard 1100 is a GUI that may display a finalize/sign a contract pane 1103 and distribute contract pane 1104. When the finalize/sign a contract pane 1103 is selected, a plurality of radio buttons may be displayed. For example, a save my contact to the platform radio button 1105 may be displayed. An analyze my contract one last time radio button 1107 may be displayed. A download my contract radio button 1109 may be displayed. An email my contract to the other party radio button 1111 may be displayed. A print my contract radio button 1113 may be displayed. An upload the signed signature pages to my contract radio button 1115 may be displayed. An e-sign the contract radio button 1117 may be displayed. The distribute contract 1104 pane may be displayed after a next button 1119 is selected.

sentence individually associated with a favorability rating (step 1310). The platform enables the user to request an alternative sentence by adjusting the favorability rating (such as through the use of a slider bar) and the platform retrieves alternative sentences associated with the same provision that have the desired favorability rating (step 1312).

As illustrative and non-limiting examples, the following sentences in the chart below may be included in a corpus, and may be used to modify or update a provision in a nondisclosure agreement. For example, the sentence "If Confidential Information is transmitted orally, the Disclosing Party shall promptly provide a writing indicating that such oral communication constituted Confidential Information."

| Favorability | Sentence |
|---|---|
| Favorable to the Disclosing Party | Confidential Information shall include any information that would otherwise qualify as such and that is disclosed visually or orally. |
| Neutral | Confidential Information shall include any information that would otherwise qualify as such and that is disclosed visually or orally, so long as a reasonable person would understand it to be confidential. |
| Favorable to the Receiving Party | Where the Confidential Information has not been reduced to written or other tangible form at the time of disclosure, and such disclosure is made orally or visually, the Disclosing Party agrees to identify it as confidential or proprietary at the time of disclosure. |
| Highly Favorable to the Receiving Party | Where the Confidential Information has not been reduced to written form at the time of disclosure, and such disclosure is made orally or visually, the Disclosing Party agrees to identify it as confidential or proprietary at the time of disclosure and to provide a summary of the Confidential Information disclosed orally or visually in written form within seven (7) days after disclosure. |

Figure 12:
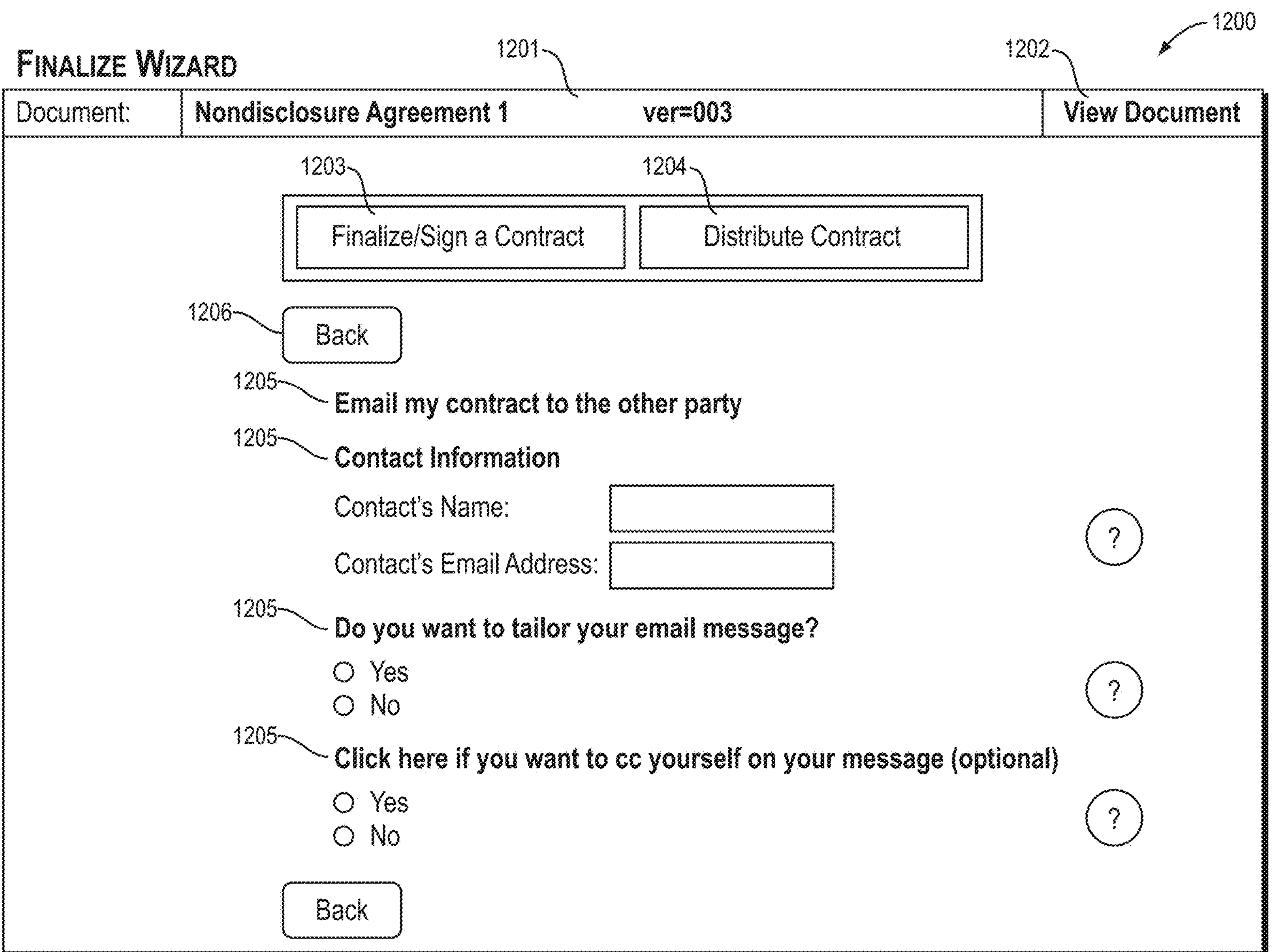
FIG. 12 is a GUI displaying one or more options to a user for e-mailing the analyzed document, in accordance with an exemplary embodiment of the disclosure.

FIG. 12 is a GUI 1200 displaying one or more options to a user for e-mailing the analyzed document, in accordance with an exemplary embodiment of the disclosure. When distribute contract panel 1200 is being displayed, the GUI 1200 may include fields 1205 for emailing the legal document to the other party. For example, an "email my contract to the other party" field may contain contact information comprising a contact's name and the contact's e-mail address. A "do you want to tailor your email message field" may be displayed in the distribute contract pane 1200. The "do you want to tailor your email message" field may have a "Yes" radio button and a "No" radio button associated with it. A "click here if you want to cc yourself on your message (optional)" field may be displayed in the distribute contract pane 1200. The distribute contract panel 1200 may include a selectable element 1202 to view the legal document. The user may visit or return to distribute contract panel 1200 by selecting the distribute contract pane 1204. The user can go back to a previous page by selecting the back button 1206. The title of the legal contract and/or the version may be shown in top panel 1201.

Figure 13:
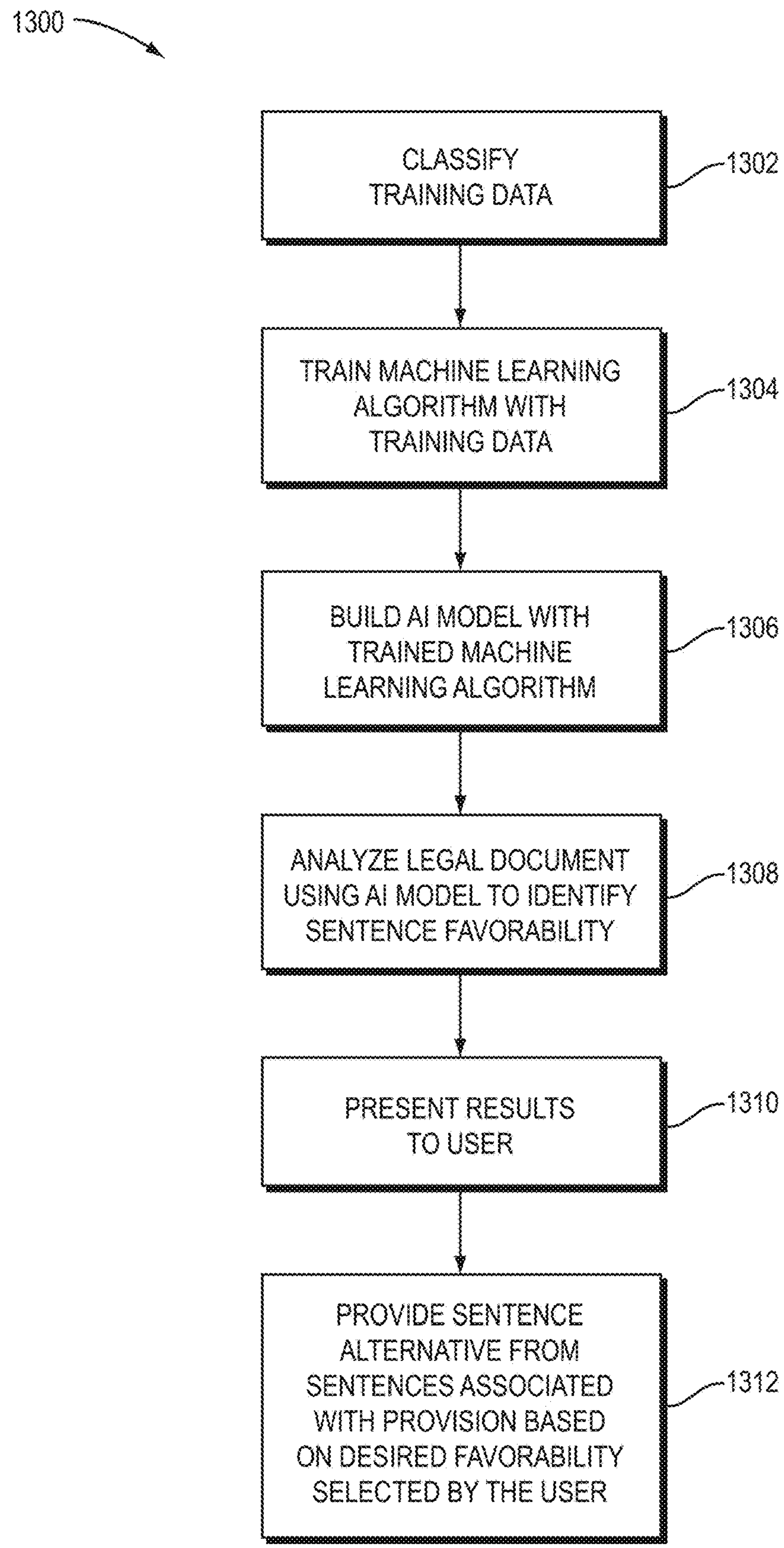
FIG. 13 depicts an exemplary sequence of steps to analyze a legal document performed by the platform in an exemplary embodiment.

FIG. 13 depicts an exemplary sequence of steps followed by the platform to analyze legal documents in an exemplary embodiment. The sequence begins with an administrator classifying training data (i.e. sentences in legal documents) as discussed above (step 1302). The platform then trains a machine learning algorithm using the training data (step 1304). Once the machine learning algorithm has trained on the training data, the administrator initiates a sequence for the machine learning algorithm to build an AI model (step 1306). Once built the AI model is used to analyze a proposed legal document received from a user to predict favorability ratings for sentences in the legal document (step 1308). The platform presents the analysis results to the user with each The platform takes the sentence from the contract and matches it to one of the sentences in the table above. It does not matter which it matches to, just that it identifies that it relates to this group of sentences. The AI model determines a favorability rating for the document sentence.

Figure 14:
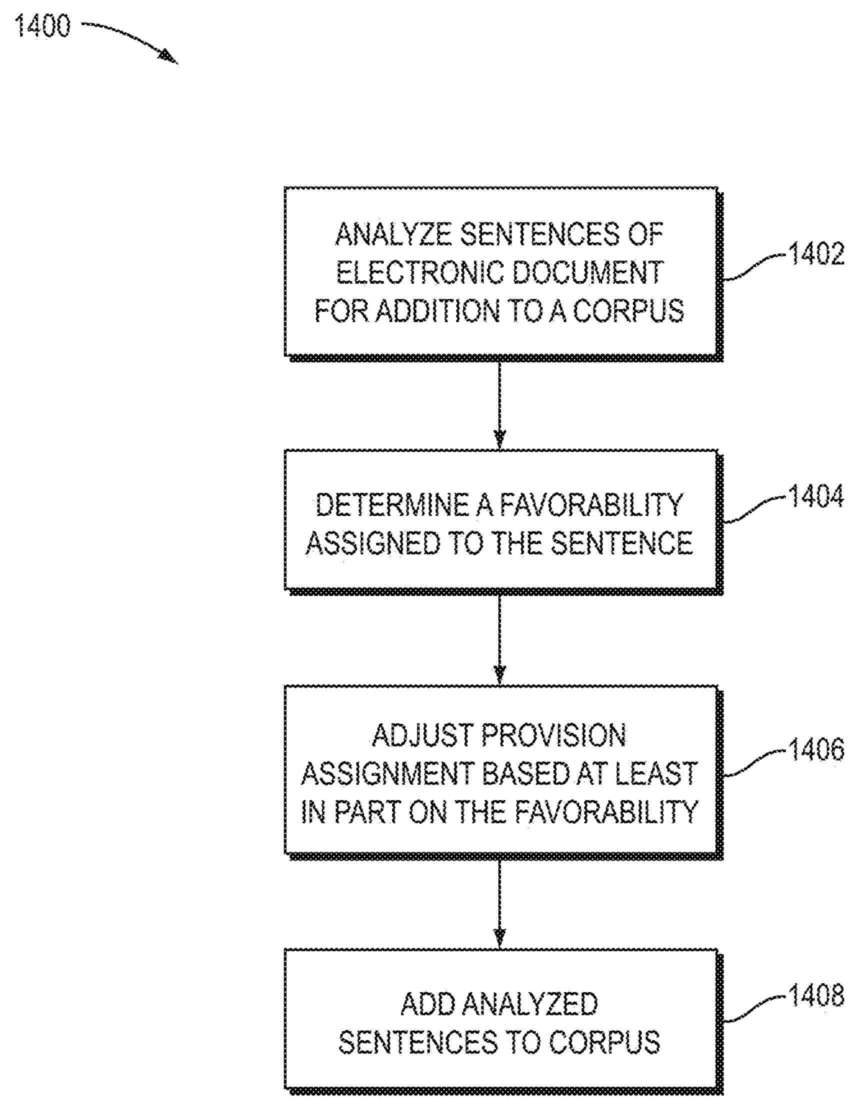
FIG. 14 depicts an exemplary sequence of steps for adding sentences to a corpus, in accordance with an exemplary embodiment of the disclosure.

FIG. 14 depicts an exemplary sequence of steps for adding sentences to a corpus, in accordance with an exemplary embodiment of the disclosure. An electronic device may analyze sentences of an electronic document in order to determine whether the sentences should be added to a corpus (step 1402). The platform determines a favorability assigned to the sentence (step 1404). The platform adjusts a provision assignment based at least in part on the favorability (step 1406). The electronic device may then add the analyzed sentence to the corpus (step 1408).

Figure 15:
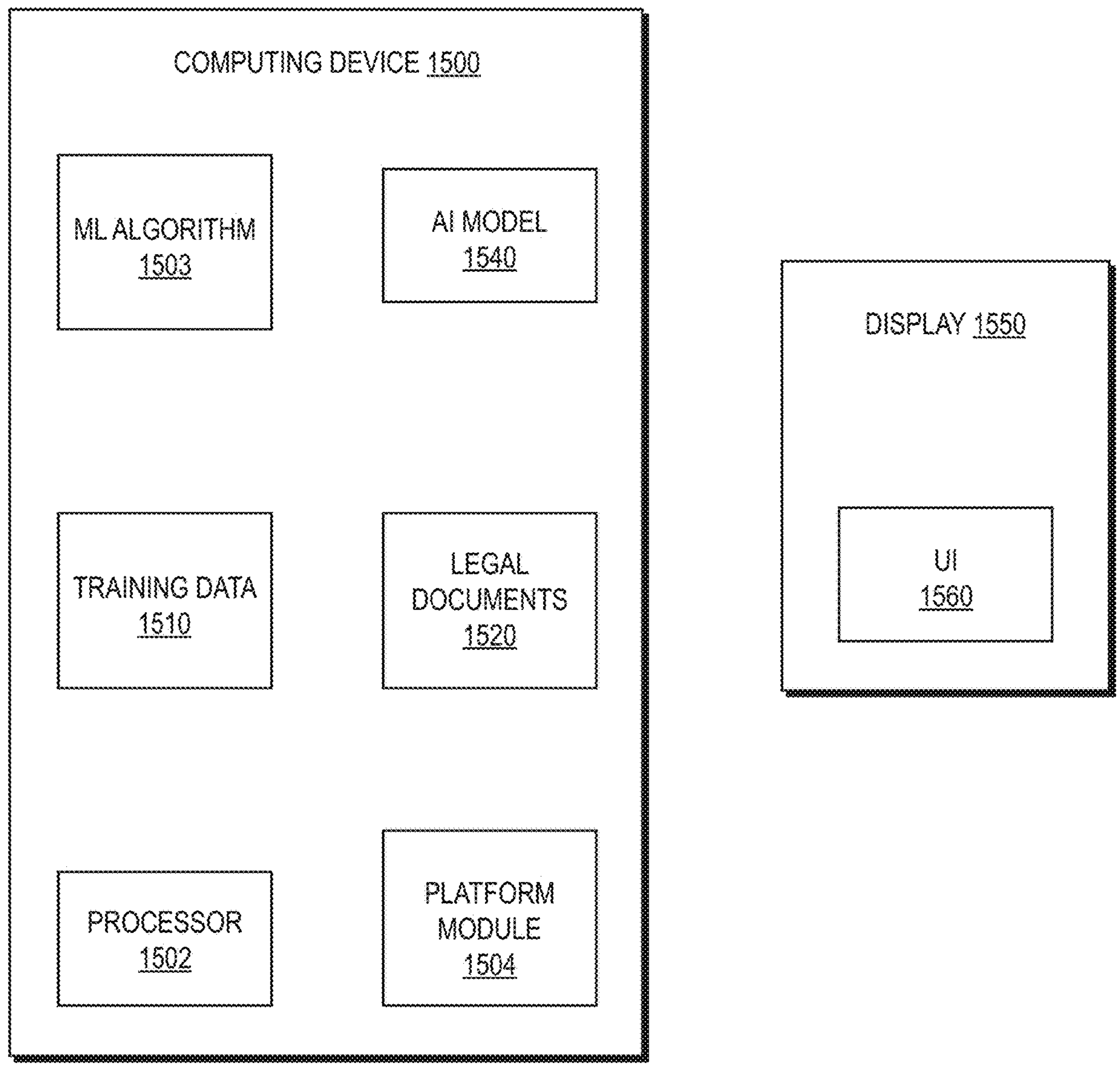
FIG. 15 depicts an exemplary legal document analysis platform, in accordance with an exemplary embodiment of the disclosure.

FIG. 15 depicts a legal document analysis platform in an exemplary embodiment. At least one computing device 1500 equipped with a processor 1502 is configured to execute a platform module 1504. Platform module 1504 includes computing device-executable instructions that are executed to classify and analyze legal documents. As described herein, platform module 1504 receives classified training data 1510 which is provided to train machine learning algorithm 1503. Machine learning algorithm 1503 when trained builds AI model 1540. AI model 1540 is used to analyze legal documents 1520 as described herein to predict the favorability of sentences appearing in a proposed legal document to a party. The results of the analysis may be presented to a user on a display 1550 in communication with computing device 1500 via a UI 1560 provided by platform module.

FIG. 16 is a GUI displaying a page for wild cards of an analyzed legal document, in accordance with an exemplary embodiment of the disclosure. Legal documents, such as contracts, often have tailored information for a particular user or a particular legal document—such as the parties' names, governing law (e.g., Delaware versus California), pricing, term of the agreement (e.g., 3 year contract term, 1 year contract term, etc.), duration of a warranty, etc. A wild card is a generic tag that replaces a piece of tailored information. For example, as shown in column 1612, the wild card {k.title} 1602 may replace the title of the contract, the wild card {b.name} 1604 may replace the buyer's name, the wild card {s.name} 1606 may replace the seller's name, etc.

The platform analyzes the contract and may identify the tailored information. A value for each identified piece of tailored information is shown in column 1608. A description associated with each value is shown in column 1610. Each description is predefined based on the wild card and stored in the database in association with the wild card. For example, the description for {s.name} is predefined as "seller's name." A wild card associated with each value is shown in column 1612.

If a piece of tailored information is omitted (for example, where names are omitted, such as "this Nondisclosure Agreement (the "Agreement") is entered into by and between _________ ("Disclosing Party") and _________ ("Receiving Party") . . . ), a value for the piece of tailored information is left blank in the wild card page but the piece of tailored information may still receive a wild card in the legal document that has been changed to include the wild card terms (for example, the wild card {b.name} may still be added for the omitted name).

The platform identifies tailored information by searching the legal document for known terms. For example, the platform identifies "California" and then replaces "California" with {b.juris}, assuming the provision is designated as a governing law provision. The database may include addresses, contacts, and other information associated with the user (as added by the user). To the extent the user chooses an alternative which includes a wild card such as {s.name}, and the user has designated a person/company as the default person/company name, then that name will be populated into that wild card field matching the choice of the user as to whether they are, for example, the disclosing party or receiving party in a non-disclosure agreement.

In a 2-party agreement, information for one side (e.g., {s.name}, {s.state}, {s.address}) may be selected from the list of addresses and contacts that the user has entered into the system previously, or the user could type new information directly into the wild card page. The user could also adjust the default values. The other side (e.g., {b.name}, {b.state}, {b.address}) may be typed directly by the user into the wild card page.

The values are the actual names of the tailored information. For example, the value of k.title is "Nondisclosure Agreement."

Wild cards enable users to add to or replace tailored information in a legal document, including replacing the wild card with a user selected value. A user may select an option 1614 to edit the value of the wild card, thereby making a global change to all references to that wild card within the legal document.

Figure 17:
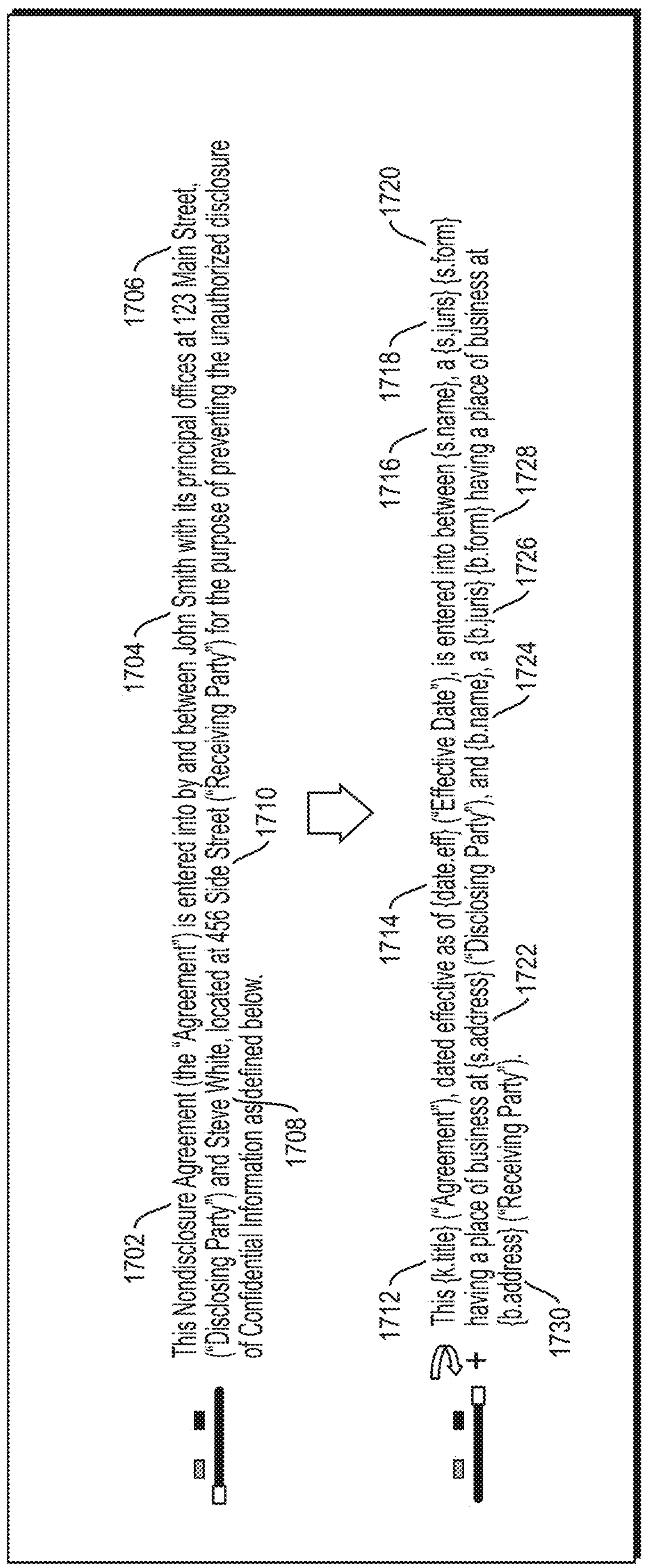
FIG. 17 depicts a section of an analyzed legal document that has been changed to include wild card terms, in accordance with an exemplary embodiment.

FIG. 17 depicts a section of the legal document that has been changed by the platform to include wild card terms, in accordance with an exemplary embodiment of the disclosure. The platform may identify tailored information 1702, 1704, 1706, 1708, 1710 in the legal document through positional comparison with a closest match within the alternatives stored in a database. The platform then populates the wild card values from the tailored information. When an alternative replaces the user's sentence, the wild card values are then populated into the alternative (for example, with wild cards 1712, 1714, 1716, 1718, 1720, 1722, 1724, 1726, 1728, 1730. For example, the platform uses a wild card to change "[t]his Nondisclosure Agreement (the "Agreement") is entered . . . " to "[t]his {k.title} ("Agreement") . . . ," where "{k.title}" is the wild card. The platform replaces the sentence(s) from an alternative in the database when the user chooses a different favorability rating, where the alternative includes the wild card values.

Using the wild card page described in FIG. 16, the user may select to change "{k.title}" to an alternative title or leave it as is. If the user changes the value of "{k.title}", all wild cards of "{k.title}" within the legal document are replaced with the changed value. This depicts an exemplary sequence of steps, but they do not have to occur in the order described above to fall within the claim.

Portions or all of the embodiments of the present invention may be provided as one or more computer-readable programs or code executable by one or more computing devices and embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A legal document analysis platform, comprising:

a classified set of training data, the classified set of training data including a plurality of sentences parsed from a plurality of legal documents and a plurality of tokenized versions of the plurality of sentences, each sentence associated with a sentence identifier that is unique thereto, associated with a legal party type, associated with a provision and associated with one of a plurality of sentence types, the plurality of sentence types including a favorability type indicative of a type of sentence to which a favorability rating for a party may be assigned, the provision being a grouping of sentences with alternative wordings that relate to the same topic;

a machine learning algorithm automatically trained, via execution of a platform module, on the classified set of training data and based at least in part on a plurality of parameters comprising a categorization versus numerical model, a number of iterations, and an amount of data being used;

an artificial intelligence (AI) model built by the trained machine learning algorithm;

at least one computing device equipped with a processor configured to or programmed to analyze, using the AI model, a proposed legal document that includes a plurality of sentences; and a user interface configured to display results of the analysis of the proposed legal document conducted using the AI model, wherein the displayed results include predicted favorability ratings for a party for each sentence in the proposed legal document, and the user interface includes a selectable element for adjusting at least one of the displayed favorability ratings, wherein in response to one or more adjusted favorability ratings, the user interface provides sentence alternatives to a user for the proposed legal document, the at least one computing device is further configured to or programmed to:

determine that at least one parameter of the plurality of parameters has been adjusted; and retrain, by execution of the platform module, the machine learning algorithm based at least in part on the adjusted parameter to create a retrained machine learning algorithm.

2. The legal document analysis platform of claim 1, wherein the predicted favorability ratings are color coded when displayed.

3. The legal document analysis platform of claim 1, wherein the platform suggests alternative sentences for one or more sentences in the proposed legal document.

4. The legal document analysis platform of claim 1, wherein selection of the selectable element to adjust the displayed favorability rating programmatically substitutes a suggested alternative sentence.

5. The legal document analysis platform of claim 1, wherein the at least one computing device is further configured to or programmed to:

identify tailored information in the proposed legal document during the analysis; and populate the tailored information as values associated with one or more wild cards, the one or more wild cards represented as one or more generic tags for the tailored information.

6. The legal document analysis platform of claim 1, wherein the at least one computing device further is configured to or programmed to:

match the proposed legal document that includes a plurality of sentences to the classified set of data.

7. A computing-device implemented method for performing legal document analysis, comprising:

receiving with a computing device equipped with at least one processor a classified set of training data, the classified set of training data including a plurality of sentences parsed from a plurality of legal documents and a plurality of tokenized versions of the plurality of sentences, each sentence associated with a sentence identifier that is unique thereto, associated with a legal party type, associated with a provision and associated with one of a plurality of sentence types, the plurality of sentence types including a favorability type indicative of a type of sentence to which a favorability rating for a party may be assigned, the provision being a grouping of sentences with alternative wordings that relate to the same topic;

automatically training, by execution of a platform module, a machine learning algorithm on the computing device with the classified set of training data and based at least in part on a plurality of parameters comprising a categorization versus numerical model, a number of iterations, and an amount of data;

building an artificial intelligence (AI) model using the trained machine learning algorithm;

analyzing a proposed legal document that includes a plurality of sentences using the AI model, the proposed legal document submitted using a graphical user interface;

displaying a result of the analysis to a user in the graphical user interface, the displayed result including predicted favorability ratings for a party for each sentence in the proposed legal document;

rendering, via the graphical user interface, a selectable element for adjusting one or more displayed favorability ratings;

providing sentence alternatives to the user for the proposed legal document in the graphical user interface in response to one or more adjusted favorability rating ratings;

determining, by the computing device, that at least one parameter of the plurality of parameters has been adjusted; and retraining, by execution of the platform module, the machine learning algorithm on the computing device based at least in part on the adjusted parameter to create a retrained machine learning algorithm.

8. The method of claim 7, wherein the predicted favorability ratings are color coded when displayed.

9. The method of claim 7, wherein sentence alternatives for one or more sentences in the proposed legal document are suggested with the displayed result of the analysis.

10. The method of claim 7, wherein selection of the selectable element to adjust the displayed favorability rating programmatically substitutes a suggested alternative sentence.

11. The method of claim 7, wherein the analysis:

identifies tailored information in the proposed legal document; and populates the tailored information as values associated with one or more wild cards, the one or more wild cards represented as one or more generic tags for the tailored information.

12. The method of claim 7, further comprising:

matching the proposed legal document that includes a plurality of sentences to the classified set of data.

13. A non-transitory medium holding computing-device executable instructions for performing legal document analysis, the instructions when executed causing at least one computing device equipped with at least one processor to:

receive a classified set of training data, the classified set of training data including a plurality of sentences parsed from a plurality of legal documents and a plurality of tokenized versions of the plurality of sentences, each sentence associated with a sentence identifier that is unique thereto, associated with a legal party type, associated with a provision and associated with one of a plurality of sentence types, the plurality of sentence types including a favorability type indicative of a type of sentence to which a favorability rating for a party may be assigned, the provision being a grouping of sentences with alternative wordings that relate to the same topic;

automatically train, by execution of a platform module, a machine learning algorithm with the classified set of training data and based at least in part on a plurality of parameters comprising a categorization versus numerical model, a number of iterations, and an amount of data;

build an artificial intelligence (AI) model using the trained machine learning algorithm;

analyze a proposed legal document that includes a plurality of sentences using the AI model, the proposed legal document submitted using a graphical user interface;

display a result of the analysis to a user in the graphical user interface, the displayed result including predicted favorability ratings for a party for each sentence in the proposed legal document;

render, via the graphical user interface, a selectable element for adjusting one or more displayed favorability rating;

provide sentence alternatives to the user for the proposed legal document in the graphical user interface in response to a user selection of an one or more adjusted favorability rating ratings;

determine that at least one parameter of the plurality of parameters has been adjusted; and retrain, by execution of the platform module, the machine learning algorithm based at least in part on the adjusted parameter to create a retrained machine learning algorithm.

14. The medium of claim 13, wherein the predicted favorability ratings are color coded when displayed.

15. The medium of claim 13, wherein sentence alternatives for one or more sentences in the proposed legal document are suggested with the displayed result of the analysis.

16. The medium of claim 13, wherein selection of the selectable element to adjust the displayed favorability rating programmatically substitutes a suggested alternative sentence.

17. The medium of claim 13, wherein the analysis:

identifies tailored information in the proposed legal document; and populates the tailored information as values associated with one or more wild cards, the one or more wild cards represented as one or more generic tags for the tailored information.

* * * * *